June 28, 1949.   J. C. McMURRAY   2,474,748
HYDRAULIC BRAKE FLUID PUMPING APPARATUS
Filed March 19, 1946   2 Sheets-Sheet 1

INVENTOR.
John C. McMurray
BY Heard Smith Tennant
Attorneys.

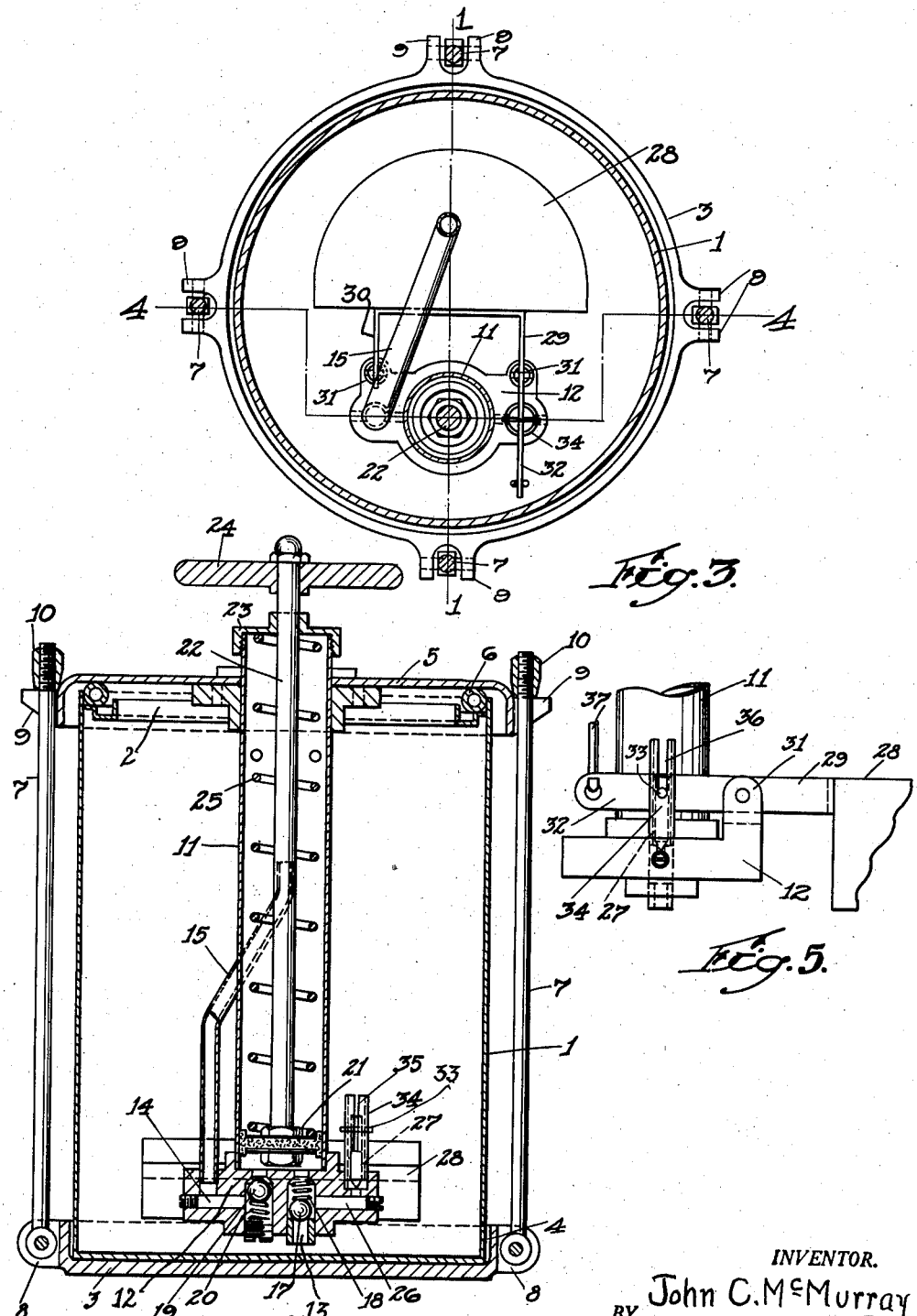

Patented June 28, 1949

2,474,748

UNITED STATES PATENT OFFICE 2,474,748

HYDRAULIC BRAKE FLUID PUMPING APPARATUS

John C. McMurray, Winthrop, Mass.

Application March 19, 1946, Serial No. 655,549

2 Claims. (Cl. 222—67)

This invention relates to an apparatus for filling and bleeding hydraulic brake systems of motor vehicles.

The fluid which is used in such hydraulic brake systems is usually sold to garages and automobile repair shops in sealed containers, and the common method of transferring the fluid from the container to the hydraulic brake system of any motor vehicle is to connect the container to the inlet opening of said hydraulic brake system, and then subject the fluid in the container to air pressure which forces the fluid through the discharge pipe into the hydraulic brake system.

One disadvantage of this method is that when the fluid level in the container gets low there is danger that some air will be delivered from the container to the hydraulic brake system along with the fluid. The presence of air or any other foreign matter in the brake system is highly detrimental and one of the objects of my present invention is to provide a novel apparatus of this type by which the fluid can be transferred from the container to the hydraulic brake system entirely free from air, water, dirt, or other foreign matter.

A still further object of the invention is to provide a novel construction by which the fluid-delivery means will become inoperative automatically when the fluid level in the container falls below a pre-determined low-level line, thus obviating any possibility that air will be delivered to the system along with the fluid.

In order to give an understanding of my invention, I have illustrated in the accompanying drawings a selected embodiment thereof which will now be described, after which the novel features will be pointed out in the appended claims.

In the drawings:

Fig. 3 is a section on the line 3—3, Fig. 1.

Fig. 4 is a section on the line 4—4, Fig. 3.

Fig. 5 is a fragmentary view illustrating the means for operating the by-pass valve.

Figure 1:
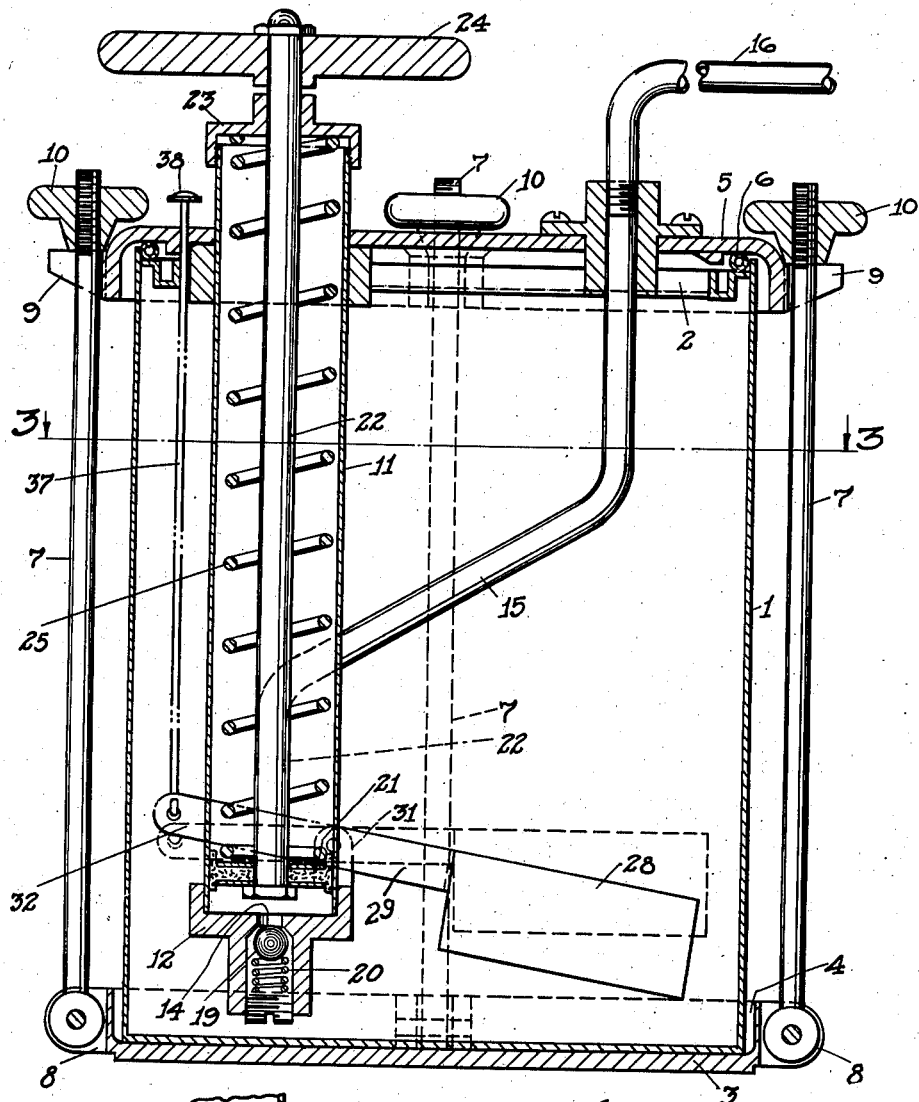
Fig. 1 is a sectional view illustrating an apparatus embodying my invention, said section being taken on the line 1—1, Fig. 3.

In the drawings, 1 indicates a container such as is used for shipping hydraulic brake fluid to garages, automobile repair shops, etc., said container having an open upper end 2 which is closed with a removable cover for purposes of shipment.

In the apparatus shown, the container 1 is held in a container holder comprising a bottom or base member 3 having a recess 4 in which the container is seated, and also comprising a cover member 5 adapted to fit over the top of the opened container, said cover 5 being shown as having a packing ring 6 associated therewith for making a tight joint. The cover member 5 is clamped to the container by means of clamping rods 7 which are pivoted at their lower ends to ears 8 with which the base 3 is provided, and the upper ends of which are received in slotted ears 9 extending from the cover member 5, each rod being shown as having a clamping nut 10 screw threaded to its upper end and by which the cover is clamped securely to the container.

Associated with the cover member 5 is a cylinder 11 which extends through the cover member and nearly to the bottom of the container. The cylinder 11 has at its lower end a cylinder head 12 which is provided with an inlet port 13 leading to the cylinder and forming a communication between said cylinder and the container, and an outlet port 14 which leads to and communicates with a delivery pipe 15, the latter extending through the cover member 5 and having an end portion 16 by which the delivery pipe can be connected to the filling opening of the hydraulic brake system of a motor vehicle.

The inlet port 13 is controlled by an inwardly opening spring-loaded inlet valve 17 which is yieldingly held to its seat by a spring 18, and the discharge port 14 is controlled by an outwardly opening spring-loaded discharge valve 19 which is held yieldingly to its seat by a spring 20.

21 indicates a piston operating in the cylinder 11, said piston having a piston rod 22 which extends through the upper cylinder head 23 and is provided with a handle 24 situated outside of the cover member 5 and by which the piston can be actuated.

The said piston 21 is a spring-loaded piston, it being acted on by a spring 25 which is situated between the piston and the upper cylinder head 23, said spring operating at all times to urge the piston 21 downwardly under a constant pressure.

In using the device, the container 1 filled with fluid is first opened by prying off the cover which was used to close the opening 2, and said filled container is then set into the recess 4 of the base 3. The cover member 5 with the cylinder 11 associated therewith is then placed on the container, the cylinder 11 being introduced into the container as shown in Fig. 1. The cover member then is clamped tightly to the container by the clamping rods 7 and clamping nuts 10 and the device is then ready for use.

In filling any hydraulic brake system, the end 16 of the delivery pipe is connected to the filling opening of master cylinder of the hydraulic brake system and the operator then raises the piston 21 by the handle 24 against the action of the spring 25. During this operation, fluid from the container 1 will be drawn into the cylinder through the inlet port 13, the outlet port 14 being held closed by the spring-pressed discharge valve 19.

After the cylinder 11 has been filled with fluid, the operator releases the handle 24 and the spring 25 then acts to force the piston 21 downwardly thereby forcing the fluid in the cylinder out through the discharge port 14 and discharge pipe 15 into the hydraulic brake system.

As the fluid is dispensed from the container 1, air will of course seep into the container around the cylinder 11 or around the discharge pipe 15.

A feature of my invention relates to means for preventing any air in the container 1 from being delivered to the hydraulic brake system along with the fluid when the fluid level in said container gets low.

For this purpose, I have provided a by-pass port 26 which leads from the inlet port 13 at a point above the inlet valve 17 to the interior of the container, said by-pass port being controlled by a by-pass valve 27 which closes against the pressure in the cylinder and is normally held closed so long as the liquid level in the container 1 is above the low level point, but which automatically opens, thereby opening the by-pass port 26, when the liquid level in the container 1 reaches a pre-determined low-level point.

Figure 2:
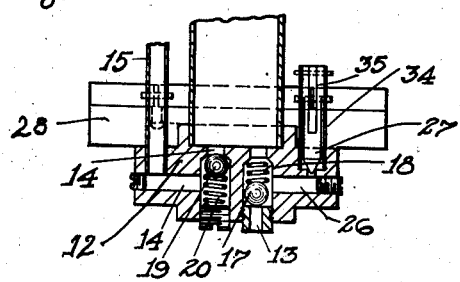
Fig. 2 is a fragmentary detail showing the inlet and discharge valves for the pump cylinder, and also showing the by-pass valve.

So long as the by-pass valve 27 is closed as shown in Fig. 2, the operation of the pump piston 21 will function to transfer fluid from the container to the hydraulic brake system as above described. When, however, the by-pass valve 27 is opened then the upward movement of the pump piston 21 merely draws fluid and air from the container into the cylinder, and the down movement of said piston merely forces the contents of the cylinder back into the container through the by-pass port, the discharge port 14 being held closed by the spring 20.

The by-pass valve 27 is controlled in its movement by a float 28 which has two arms 29, 30 that are pivotally mounted on ears 31 with which the lower cylinder head 12 is provided. The arm 29 is formed with an extension 32 to which the by-pass valve 27 is pivotally connected by a pin 33.

The by-pass valve 27, which, as stated above, closes against the pressure in the cylinder 11, is shown as mounted in a guiding cylinder 34 which is carried by the lower cylinder head 12 and has an open top, said guiding cylinder 34 having a slot 35 in which the arm extension 32 operates, and also having another slot 36 in which the pin 33 operates.

So long as the fluid level in the container 1 is above the low level point, the float 28 will be held in its raised position shown in dotted lines, Fig. 1, and the by-pass valve 27 will thereby be held closed against the pressure in the cylinder 11 as shown in Fig. 2, the by-pass valve being held to its seat by the full buoyancy of the float. When the fluid level in the container 1 falls to a level which permits the float 28 to drop to the full-line position, Fig. 1, the by-pass valve 27 will be raised, thereby opening the by-pass port 26. When the by-pass port is opened, the pump piston will become inoperative for forcing the fluid from the container through the discharge port and the discharge pipe, and the only effect resulting from the up and down movement of the piston 21 is to draw fluid and air from the container into the cylinder through the by-pass port 26 and then to force the air and fluid out of the cylinder back into the container through said by-pass port. The construction herein shown is effective to prevent any air from being drawn into the cylinder 11 when the liquid level in the container 1 falls to a point where the float 28 occupies a position between its upper dotted line position, Fig. 1, and its low full line position. So long as the liquid level in the tank is above the dotted line position of the float, the by-pass valve 27 is held to its seat against the pressure in the cylinder by the full buoyant effect of the float. When, however, the liquid level in the tank falls to a point so that the float will be balanced in a position midway between the full and the dotted line positions, Fig. 1, the buoyant effect of the float in holding the by-pass valve 27 to its seat against the pressure in the cylinder will be reduced. At such time if the piston is given a rapid upward movement, the suction thereby produced might be sufficient to draw some air into the lower end of the cylinder through the inlet valve by cavitation. With the float thus in the midway position, when the piston is released, the pressure which the float exerts on the by-pass valve tending to close it is reduced because of the reduced buoyant effect of the float, and the pressure in the cylinder 11 produced by the expanding action of the spring 25 will be sufficient to raise and thus open the by-pass valve so that the fluid in the cylinder 11 and any air entrained therein will be forced back into the container through the opened by-pass valve. My device, therefore, is effective in preventing any air from being drawn into the cylinder 11 not only when the float 28 is in its full lowered position, but when the liquid level in the container is at a point where the buoyant action of the float in holding the by-pass valve closed is reduced.

The device therefore becomes inoperative automatically whenever the fluid in the container 1 reaches a predetermined low-level point.

37 indicates a rod which extends through the cover member 5 and is connected at its lower end to the arm extension 32, said rod having a knob 38 on its upper end by which the float can be operated, thereby to manipulate the by-pass valve 27 if it is desired to do this while the fluid level in the container is still above the low-level point. It will be observed that with the device of this application the container 1 will still remain sealed after the sealed cover has been removed from the opening 2 and after the said opened container has been fitted into the container holder comprising the base 3 and cover member 5. The container 1, therefore, is kept free of dirt or other foreign matter while the fluid therein is being dispensed.

I claim:

1. An apparatus for filling hydraulic brake systems of motor vehicles comprising a container, a cover member for the container, a cylinder carried by the cover member and depending into the container, said cylinder having inlet and discharge ports at its lower end, inlet and discharge valves controlling said ports, a piston in said cylinder, means accessible from the exterior of the cover member to give said piston its suction stroke, a spring within the cylinder for giving said piston its discharge stroke, said cylinder also having a by-pass port which provides communication between the interior of the cylinder and the interior of the container, a by-pass valve separate from both the inlet and discharge valves for controlling said by-pass port said by-pass valve closing against the pressure in the cylinder and a float connected to said by-pass valve and holding it closed so long as the liquid level in the container is above a pre-determined low-level point but opening the valve when said liquid level falls below said pre-determined low-level point.

2. An apparatus for filling hydraulic brake systems of motor vehicles comprising a container, a cover member for the container, a cylinder carried by the cover member and depending into the container, said cylinder having at its lower end both an inlet port and a discharge port, a spring-loaded inlet valve controlling the inlet port, a spring-loaded discharge valve controlling the discharge port, a piston in said cylinder, means accessible from the exterior of the cover member to give said piston its suction stroke, a spring within the cylinder for giving said piston its discharge stroke, said cylinder also having at its lower end a by-pass port which communicates at one end with the interior of the container and at its other end with the inlet port between the inlet valve and the cylinder, a by-pass valve separate from both the inlet valve and the discharge valve and movable between open and closed positions for opening and closing the by-pass port, said valve closing against the pressure in the cylinder, a float pivoted to the lower end of the cylinder and located within the container, said float being held in raised position by the liquid in the container when the liquid level therein is above a low level point but falling to a low position when said liquid level falls below said low level point, and means actuated by the float to hold the by-pass valve closed when the liquid level in the container is above low level point and to hold said by-pass valve open when the liquid level is below said low level point.

JOHN C. McMURRAY.

REFERENCES CITED

The following references are of record in the file of this patent:

UNITED STATES PATENTS

| Number | Name | Date |
| --- | --- | --- |
| 568,522 | Conover | Sept. 29, 1896 |
| 1,608,589 | Engstrom | Nov. 30, 1926 |
| 1,676,358 | Schott | July 10, 1928 |
| 1,963,783 | Fox | June 19, 1934 |
| 2,264,215 | McClish | Nov. 25, 1941 |
| 2,269,857 | Nielsen | Jan. 13, 1942 |